Patented Sept. 19, 1950

2,523,065

UNITED STATES PATENT OFFICE 2,523,065

PIGMENTED COATING COMPOSITIONS CONTAINING LIQUID ALKYL POLYSILOXANE

Craig M. Sage, Schenectady, N. Y., assignor to General Electric Company, a corporation of New York No Drawing. Application December 29, 1947, Serial No. 794,443

11 Claims. (Cl. 260—19)

This invention is concerned with pigmented coating compositions having improved properties, and methods of preparing the same. More particularly, the invention relates to a composition of matter exhibiting a decreased tendency to pigment flotation, the said composition comprising (1) a pigmented resinous coating composition and (2) from 0.000001 to 0.01 per cent, by weight, based on the weight of the coating composition (i. e., on the total weight of the resin and pigment), of a liquid alkyl (e. g., a lower alkyl, for instance, methyl, ethyl, propyl, isopropyl, butyl, amyl, etc.) polysiloxane.

One of the objects of this invention is to prepare pigmented resinous coating compositions having good pigment anti-flotation properties.

Another object of this invention is to eliminate the tendency of pigmented coating compositions to exhibit "silking" and "flow lines."

A further object is to produce pigmented resinous coating compositions which yield smooth surfaces without the danger of the appearance of what is known as "orange peel" in the surface.

Other objects of this invention will become more apparent as the description thereof proceeds.

Heretofore, the use of pigmented resinous coating compositions has often been accompanied by the appearance of several defects in the coated surface after the coating composition has dried. Among these defects has been the tendency of the coating to exhibit pigment flotation, i. e., the appearance of streaks of pigment in the coated surface. Another defect often resulting from the use of the aforementioned pigmented protective coatings has been the appearance of "flow lines" caused by the poor leveling of the coating composition. Finally, lacquers and baking enamels have often exhibited rough and uneven surfaces commonly referred to in the art as an "orange peel" surface.

I have now discovered that all the foregoing defects frequently encountered in connection with the use of pigmented resinous protective or decorative coatings may be avoided by incorporating in the said coating composition a small amount (e. g., from 0.000001 to 0.01, preferably from 0.00001 to 0.001, per cent, by weight, of the total weight of the resin and pigment in the coating composition) of a liquid alkyl polysiloxane, preferably, a methylpolysiloxane, having an alkyl-to-silicon ratio of from 1.95 to 2.2 alkyl groups per silicon atom, more particularly from 1.98 to 2.1 or even 2.0 alkyl groups per silicon atom. The elimination of the above-described defects is not accompanied by any perceptible detrimental effect on the drying rate or adhesion characteristics of the protective coating. In addition, the presence of the liquid alkyl polysiloxane seems to improve the pigment wetting and water-resistance of the said coating composition.

The liquid alkyl polysiloxanes found suitable in effecting the above-described improvements in the properties of the pigmented coating composition are those obtained, for example, by the hydrolysis of an alkylhalogenosilane, e. g., a methylhalogenosilane, for instance, pure or substantially pure dialkyl-substituted dichlorosilane, e. g., dimethyldichlorosilane, or an alkyl-substituted, e. g., methyl-substituted silane (the methyl groups being joined to the silicon atom through carbon atoms), whose other valences are satisfied by radicals which themselves are readily hydrolyzable, for instance, hydrogen, amino, alkoxy, aroxy, acyloxy, etc., radicals. The terms "liquid alkyl polysiloxane" and "liquid methyl polysiloxane" have been broadly used to designate simple and complex condensation products containing an average of from 1.95 to 2.2 alkyl (e. g., methyl) groups per silicon atom. Optimum results appear to be obtained when the liquid alkyl polysiloxane contains at least 12 silicon atoms (or at least an average of 12 silicon atoms) in the polysiloxane chain (or chains).

Various methods may be employed to prepare the liquid alkyl polysiloxanes used in the practice of this invention. For example, substantially pure dimethyldichlorosilane containing up to about 5 (preferably from 0.1 to 2) mol per cent methyltrihalogenosilane, more specifically methyltrichlorosilane, is hydrolyzed in manners now well known in the art. Stated alternatively, with regard to the use of certain liquid methyl polysiloxanes found desirable in the practice of my claimed invention, they may be considered as being comprised of liquid polymeric dimethylsiloxane containing up to 5 mol per cent, preferably from 0.1 to 2 mol per cent, copolymerized monomethylsiloxane.

The oily hydrolysis product may then be fractionally distilled to remove the low boiling materials (trimers, tetramers, etc.) thereby obtaining the higher molecular weight liquid methyl polysiloxanes, which may then be added (advantageously in the form of a dilute solution using a solvent miscible with the film-forming ingredients, e. g., aromatic and aliphatic hydrocarbons, etc.) to the particular pigmented resinous coating composition. If desired, the hydrolyzed mixtures of hydrolyzable dimethyl-substituted silanes, either among themselves or with other hydrolyzable silanes containing, for example, one methyl group substituted on the silicon atom, for instance, methyltrichlorosilane, may be caused to react with, for example, hexamethyldisiloxane, in the presence of sulphuric acid. More specific directions for the hydrolysis of hydrolyzable methyl-substituted silanes to form liquid methyl polysiloxanes may be found, for example, in Patnode applications, Serial Nos. 463,813, now abandoned, 463,814, now Patent Number 2,469,888, and 463,815, now abandoned, filed October 29, 1942, and in Wilcock application, Serial No. 656,162, filed March 21, 1946, now Patent Number 2,491,843, the foregoing applications being assigned to the same assignee as the present invention.

Hydrolysis of the above silanes or mixtures of silanes results in the formation of silanols, i. e., alkyl-substituted silanes containing hydroxy groups substituted directly on the silicon, which hydroxy groups almost immediately condense intermolecularly by intercondensation splitting out water to give siloxane linkages having the following structure

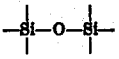

wherein a preponderant number of valences of the silicon atoms are satisfied by the substitution thereon by alkyl radicals.

Such intercondensations are accelerated by acidic materials, for example, sulphuric acid, hydrochloric acid, ferric chloride, etc., as well as by basic materials, for example, sodium hydroxide, potassium hydroxide, etc. As a result of the hydrolysis and condensation, liquid alkyl-substituted polysiloxanes may be produced which may have on the average up to as high as 2.2 alkyl groups substituted on each silicon atom. The liquid alkyl polysiloxanes prepared in this manner consist essentially of silicon atoms joined together by oxygen atoms through silicon-oxygen linkages and alkyl radicals attached to silicon through carbon-silicon linkages, the remaining valences, if any, of the silicon atoms being satisfied by hydroxyl and/or by residual unhydrolyzed radicals such as the hydrolyzable radicals listed previously.

The pigmented resinous coating compositions whose properties may be effectively improved by means of my claimed invention comprise liquid coating compositions ordinarily employed as pigmented decorative or protective surfacing compositions or enamels. These include, for example, pigmented oil-modified alkyd resins, either alone or in combination with amido-aldehyde resins (i. e., aminoplast resins) e. g., urea-formaldehyde, melamineformaldehyde resins, etc., pigmented coating compositions prepared, for example, from esters or ethers of cellulose, for instance, ethyl cellulose, cellulose acetate, etc., nitrocellulose, oil-modified phenol-aldehyde resins, for instance, oil-modified para-tertiary butyl phenol-aldehyde resins, etc., pigmented acrylic acid ester resins, pigmented chlorinated rubber compositions, as well as the many other pigmented lacquers, enamels and paints employed as decorative and protective coatings.

My invention is particularly applicable in the case of modified (e. g., oil-modified) alkyd resins. By the term "modified alkyd resin" as used herein, I mean the resinous condensation product resulting from the reaction of one or more polyhydric alcohols with a polycarboxylic acid (or anhydride) and one or more of the following modifying ingredients, for instance, modifying oils, e. g. non-drying oils, semi-drying oils, drying oils, fatty oils, fatty oil acids, etc., derived either from vegetable or animal sources or produced synthetically, etc.; esters, specifically glycerides of fatty acids, etc.; and mixtures of one or more of these modifying ingredients with natural resins, as well as other equivalent products.

Examples of polycarboxylic acids (or anhydrides) are oxalic, malonic, succinic, adipic, phthalic acid (or anhydride), halogenated phthalic acids, for example, tetrachlorophthalic acid (or anhydride), 4-chlorophthalic acid, isophthalic acid, etc.

Examples of polyhydric alcohols (dihydric, trihydric, etc.) which may be used in this invention are ethylene glycol, diethylene glycol, propylene glycol, glycerine, sorbitol, pentaeryrithritol, etc. Monohydric alcohols, for example those boiling above 150° C., such as alkyl ethers of glycols, for instance, alkyl ethers of ethylene and diethylene glycol, etc., may also be used.

The modifying ingredients, including modifying oils in the raw, heated, or blown state, which may be employed in the preparation of the modified alkyd resins are, for example, linseed oil, chainawood oil, castor oil, soya bean oil, oiticica oil, linseed oil acids, coconut oil acids, palmitic acid, stearic acid, oleic acid, etc. The amount of the modifying ingredients may be varied within wide limits, for example, from 5 to 70 per cent, preferably from 10 to 60 per cent, by weight, of the total weight of the modifying ingredients, the polyhdric alcohol, and the polybasic acid or acids (or anhydride if used) present in the reaction mixture.

Equimolecular portions of the polyhydric alcohol and the polycarboxylic acid or anhydride may be used in making the modified alkyd resin. I prefer to use at least a slight excess of the polyhydric alcohol in order to cause the reaction to go more fully to completion. Techniques for making these modified alkyd resins will be clearly apparent from prior work published in connection with alkyd resin preparations by the many workers in this art.

Among the various pigments which may be incorporated in the resinous coating compositions may be mentioned, for example, carbon black, lamp black, ferric oxide, titanium dioxide, lithopone, ferric hydroxide, zinc chromate, zinc oxide, lead carbonate, lead chromate, silicates, for example, manganese silicate, etc., ferric ferrocyanide blue, sulphates, arsenates, and other inorganic salts, etc.

The amount of pigment employed in the coating composition may be varied within wide limits depending on the application, the resin employed, the pigment used, etc. Thus, I may use from 0.1 to 4 or more parts, by weight, of the pigment per part of the resin comprising the coating composition. Smaller or larger amounts may be employed without departing from the scope of the invention.

In order that those skilled in the art may better understand how the present invention may be practiced, the following examples are given by way of illustration and not by way of limitation. All parts are by weight.

*Example 1*

A liquid methyl polysiloxane was prepared by hydrolyzing dimethyldichlorosilane containing about 6 to 8 mol per cent methyltrichlorosilane. The hydrolyzed liquid product was washed free of acid, dried, and reacted with sufficient hexamethyldisiloxane (in this case about 4 to 6 per cent, by weight, hexamethyldisiloxane) in the presence of sulphuric acid to yield a liquid methyl polysiloxane containing an average ratio of from 1.98 to 2.0 methyl groups per silicon atom. A portion of the finally obtained liquid methyl polysiloxane was dissolved in toluene in the form of a 1 per cent, by weight, solution.

A modified alkyd resin was prepared by heating a mixture comprising 20 parts soya bean oil acids, 10.5 parts glycerine, and 20 parts phthalic anhydride were heated for about 5 to 7 hours at around 225–250° C. in an inert atmosphere until an acid number of from 6 to 8 was obtained.

The resin was cooled and dissolved in xylene to make a 50 per cent, by weight, solution.

To about 54 parts of the above-prepared oil-modified alkyd resin solution were added 40 parts lithopone and small amounts of lamp black, chrome green, iron oxide, and chrome yellow, together with about 13 parts of additional solvent (petroleum spirits and high boiling liquid aromatic hydrocarbons) to yield a gray-pigmented enamel having a viscosity of about 400–500 c. p. at 25° C. The enamel was ground in a ball mill to give a homogeneous pigmented, resinous coating composition.

The above-prepared pigmented, oil-modified alkyd resin enamel, when applied by dipping to a metallic surface and the coated surface exposed to air for a short time immediately exhibited flotation of the pigment as evidenced by streaking of the surface.

To the aforementioned pigmented oil-modified alkyd resin enamel was added 1½ per cent, by weight, based on the weight of the said enamel, of a 1 per cent toluene solution of the liquid methyl polysiloxane. Another metal strip was dipped in this mixture and air-dried as before. The surface of this sample was perfectly plain, smooth, and glossy and exhibited no pigment flotation.

*Example 2*

In this example, to 99 parts of the oil-modified alkyd resin enamel (exhibiting pigment flotation) of Example 1 was added about 0.63 part of a 1 per cent, by weight, toluene solution of a liquid methyl polysiloxane consisting of a mixture of linear methyl polysiloxanes containing from 12 to 16 carbon atoms and being represented by the general formula

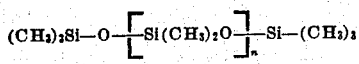

where $n$ is a whole number equal to from 10 to 14. Use of this modified enamel resulted in a coated surface exhibiting no pigment flotation.

*Example 3*

The product of hydrolysis of dimethyldichlorosilane was isolated and amounts of this liquid oily product were added to the oil-modified alkyd resinous coating composition of Example 1, which exhibited pigment flotation. When 0.001 per cent, by weight, of this oil dissolved in toluene (based on the weight of the coating composition), was added, and the modified coating composition applied to a surface and allowed to dry, there was obtained a smooth, glossy film which showed no evidence of pigment flotation. The use of 0.01 per cent of this oil also reduced the pigment flotation. Amounts in substantial excess of 0.01 per cent appeared to have no effect on pigment flotation.

*Example 4*

In this example, to a Chinawood oil-modified para-tertiary butyl phenol-formaldehyde resin enamel pigmented with titanium dioxide and lamp black, which enamel exhibited pigment flotation, was added about 1½ per cent, by weight, based on the weight of the enamel, of the 1 per cent liquid methyl polysiloxane solution. The addition of the aforementioned liquid methyl polysiloxane resulted in elimination of the pigment flotation.

*Example 5*

In this example, the same enamel was employed as in Example 2 with the exception that the pigment was red iron oxide instead of the titanium dioxide and lamp black used in Example 4. This pigmented enamel, which showed strong evidence of pigment flotation, was rendered completely acceptable as to clearness and smoothness of the surface by the addition thereto of the same amount of liquid methyl polysiloxane as employed in Example 4.

*Example 6*

A titanium dioxide-pigmented chlorinated rubber-phenolic resin coating composition exhibiting pigment flotation was rendered acceptable and the pigment flotation eliminated by the addition to the enamel of about the same amount, by weight, of the liquid methyl polysiloxane employed in Example 4.

*Example 7*

A carbon-black pigmented, soya bean oil-modified alkyd resin enamel modified with about 15 per cent, by weight, of a butyl alcohol-modified melamine-formaldehyde resin, which showed undesirable "orange peel" characteristics on application to a flat surface, was corrected and this "orange peel" eliminated by the addition thereto of about 1 per cent, by weight, of the 1 per cent toluene solution of the liquid methyl polysiloxane prepared in Example 1. The surface obtained was smooth and free of any surface defects.

Although the foregoing examples disclose the use of various resinous coating compositions together with a particular liquid methyl polysiloxane to obtain the desired properties of the pigmented resinous coating composition, it will, of course, be apparent to those skilled in the art that other pigmented coating compositions exhibiting pigment flotation, as well as other liquid alkyl polysiloxanes, many examples of which have been disclosed previously, may be employed in place of the foregoing enamels or coatings and liquid methyl polysiloxanes. The latter include liquid ethyl, propyl, isopropyl, methyl ethyl, butyl, etc., polysiloxanes.

My invention not only enables one to prepare pigmented resinous coating compositions exhibiting a decreased or no tendency towards pigment flotation, but it is also possible to reclaim pigmented coating compositions rejected because of pigment flotation and make them acceptable as coating agents.

In addition to the liquid alkyl polysiloxanes disclosed above, I have also found that pigment flotation can be reduced and eliminated in pigmented resinous coating compositions by using such materials as, for example, dimethyl germanium sulfide [$(CH_3)_2GeS$], the preparation of which is more particularly disclosed and claimed in Rochow application Serial No. 791,664, now Patent Number 2,506,386, filed December 13, 1947, and assigned to the same assignee as the present invention; as well as a polymeric composition of matter containing in its molecular structure a plurality of silicon atoms linked directly to each other, each silicon atom bearing only two methyl groups, and a plurality of silicon atoms linked to each other through oxygen atoms where each silicon atom has two methyl groups attached thereto, the said composition containing about 2 per cent chlorine. The following example illustrates more particularly the method of preparation of the latter one of these anti-flotation agents and its use in pigmented resinous coating compositions to eliminate pigment flotation.

*Example 8*

About 454 parts sodium metal was placed in a pressure bomb together with 866 parts dry xylene and 645 parts dimethyldichlorosilane. The reaction temperature rose autogenously up to about 200° C. and then subsided. The bomb was then heated for about 6 hours at 115° C. The xylene-soluble material present in the reaction mixture was fractionally distilled and that fraction remaining as a residue after all volatile material boiling up to 300° C. at 3 mm. pressure was isolated. Analysis of this compound showed that it was a polymeric composition of matter comprising a plurality of

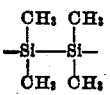

linkages and a plurality of

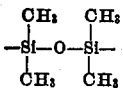

linkages and containing about 2 per cent chlorine. A sample of this polymeric material was dissolved in toluene to make a 1 per cent, by weight, solution.

One per cent, by weight, of the foregoing toluene solution was added to the oil-modified alkyd resin coating composition comprising a castor oil-modified glyceryl phthalate resin modified with about 20 per cent, by weight, of a butylated melamine-formaldehyde resin, and the said coating composition was applied by dipping to a flat surface. When this surface was air-dried there was obtained a glossy, smooth film which exhibited no evidence of pigment flotation.

What I claim as new and desire to secure by Letters Patent of the United States is:

1. In the process for decreasing the tendency of a pigmented resinous coating composition selected from the class consisting of pigmented oil-modified alkyd resins and pigmented oil-modified phenol-aldehyde resins to exhibit pigment flotation, the step which comprises adding to the aforesaid coating compositions and mixing therein from 0.000001 to 0.01 per cent, by weight, based on the weight of the coating composition, of a liquid alkyl polysiloxane having an average of from 1.95 to 2.2 alkyl groups per silicon atom.

2. In the process for decreasing the tendency of a pigmented coating composition selected from the class consisting of pigmented oil-modified alkyd resins and pigmented oil-modified phenol-aldehyde resins to exhibit pigment flotation, the step which comprises adding to the aforesaid coating compositions and mixing therein from 0.000001 to 0.01 per cent, by weight, based on the weight of the coating composition, of a liquid methylpolysiloxane containing an average of from 1.95 to 2.2 methyl groups per silicon atom.

3. In the process for decreasing the tendency of a pigmented oil-modified alkyd resinous coating composition to exhibit pigment flotation, the step which comprises adding to the aforesaid coating compositions and mixing therein from 0.000001 to 0.001 per cent, by weight, based on the weight of the coating composition, of a liquid polymeric dimethylsiloxane containing up to 5 mol per cent copolymerized monomethylsiloxane and having an average of from 1.95 to 2.2 methyl groups per silicon atom.

4. In the process for decreasing the tendency of a pigmented oil-modified phenol-aldehyde resinous coating composition to exhibit pigment flotation, the step which comprises adding to the aforesaid coating compositions and mixing therein from 0.000001 to 0.001 per cent, by weight, based on the weight of the coating composition, of a liquid polymeric dimethylsiloxane containing up to 5 mol per cent copolymerized monomethylsiloxane and having an average of from 1.95 to 2.2 methyl groups per silicon atom.

5. In the process for decreasing the tendency of a pigmented oil-modified, amido-aldehyde-modified alkyd resinous coating composition to exhibit pigment flotation, the step which comprises adding to the aforesaid coating compositions and mixing therein from 0.000001 to 0.001 per cent, by weight, based on the weight of the coating composition, of a liquid polymeric dimethylsiloxane having a methyl-to-silicon ratio of from 1.98 to 2.2 and containing from 0.1 to 2 mol per cent copolymerized monomethylsiloxane.

6. A pigmented coating composition selected from the class consisting of pigmented oil modified alkyd resins and pigmented oil-modified phenol-aldehyde resins exhibiting a decreased tendency to pigment flotation, the said coating composition having incorporated therein from 0.000001 to 0.01 per cent, by weight, based on the weight of the coating composition, of a liquid alkyl polysiloxane having an average of from 1.95 to 2.2 alkyl groups per silicon atom.

7. A composition of matter exhibiting good resistance to pigment flotation, said composition comprising (1) a pigmented resinous coating composition selected from the class consisting of pigmented oil-modified alkyd resins and pigmented oil-modified phenol-aldehyde resins and (2) from 0.000001 to 0.01 per cent, by weight, based on the weight of the coating composition, of a liquid methylpolysiloxane containing an average of from 1.95 to 2.2 methyl groups per silicon atom.

8. A composition of matter exhibiting good pigment anti-flotation properties, the said composition comprising (1) a pigmented oil-modified alkyd resinous coating composition and (2) from 0.000001 to 0.001 per cent, by weight, based on the weight of the coating composition, of a liquid polymeric dimethylsiloxane containing up to 5 mol per cent copolymerized monomethylsiloxane and having an average of from 1.95 to 2.2 methyl groups per silicon atom.

9. A composition of matter exhibiting good pigment anti-flotation properties, the said composition comprising (1) a pigmented oil-modified phenol-aldehyde resinous coating composition and (2) from 0.000001 to 0.001 per cent, by weight, based on the weight of the coating composition, of a liquid polymeric dimethylsiloxane containing up to 5 mol per cent copolymerized monomethylsiloxane and having an average of from 1.95 to 2.2 methyl groups per silicon atom.

10. A pigmented composition of matter exhibiting good pigment anti-flotation properties, the said composition comprising (1) a pigmented oil-modified, amido-aldehyde-modified alkyd resinous coating composition and (2) from 0.000001 to 0.001 per cent, by weight, based on the weight of the coating composition, of a liquid methyl polysiloxane containing an average ratio of from 1.98 to 2.2 methyl groups per silicon atom.

11. A pigmented composition of matter exhibiting good resistance to pigment flotation, the said composition comprising (1) a pigmented resinous coating composition selected from the class consisting of pigmented oil-modified alkyd resins and pigmented oil-modified phenol-aldehyde resins and (2) from 0.000001 to 0.01 per cent, by weight, based on the weight of the coating composition, of the hydrolysis product of dimethyldichlorosilane, the said liquid hydrolysis product having an average of from 1.98 to 2.0 methyl groups per silicon atom.

CRAIG M. SAGE.

REFERENCES CITED

The following references are of record in the file of this patent:

UNITED STATES PATENTS

| Number | Name | Date |
|---|---|---|
| 2,375,007 | Larsen | May 1, 1945 |

OTHER REFERENCES

Rochow, Chemistry of The Silicones, Wiley, 1946, pages 64 and 65.

Bass, Chemistry and Industry, April 5, 1947, pp. 171 and 174.